D. L. CALAHAN.
TURNING TOOL.
APPLICATION FILED JAN. 17, 1911.
1,003,584.
Patented Sept. 19, 1911.
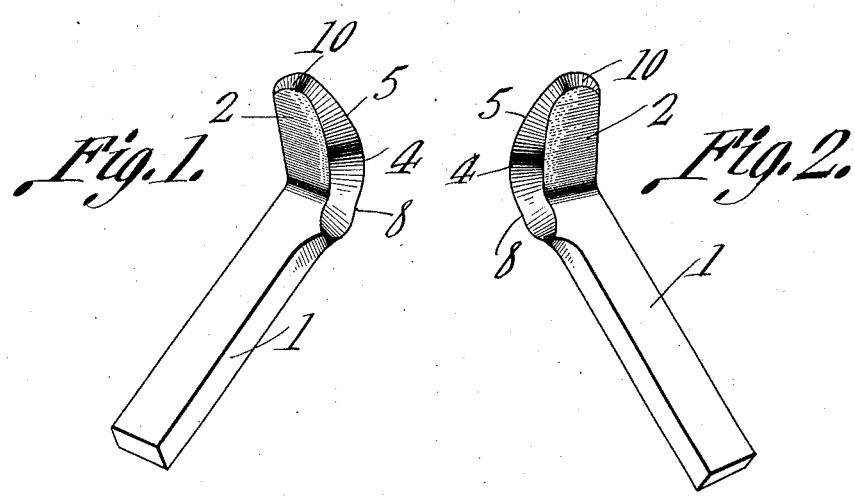
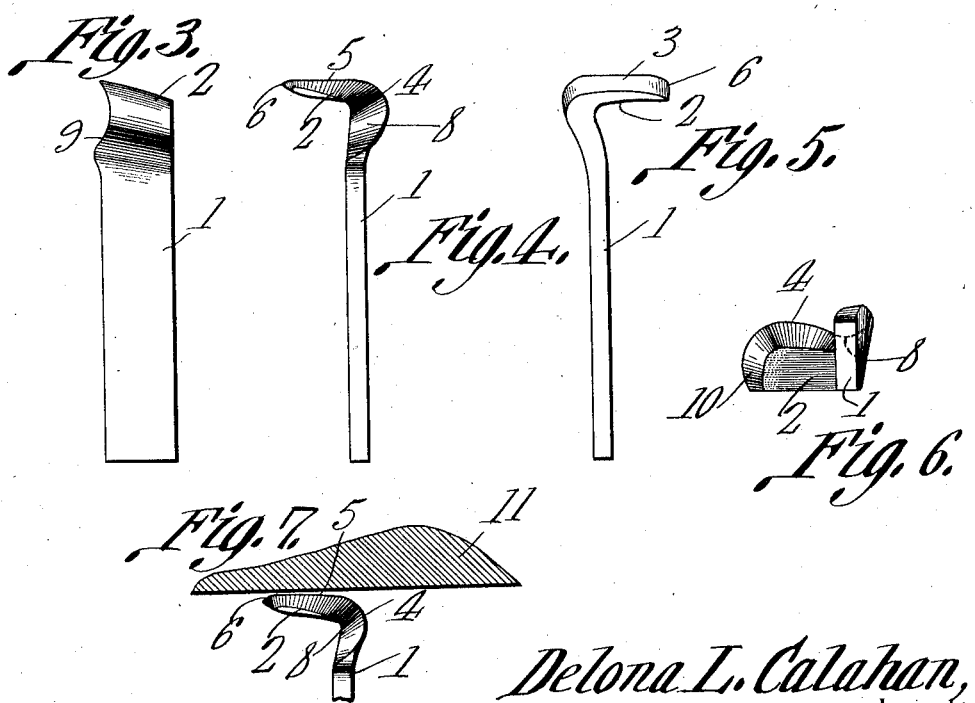
Delona L. Calahan, Inventor
Witnesses
by Attorneys

UNITED STATES PATENT OFFICE.

DELONA L. CALAHAN, OF CENTRALIA, WASHINGTON.

TURNING-TOOL.

1,003,584.　　　　　　　Specification of Letters Patent.　　Patented Sept. 19, 1911.

Application filed January 17, 1911. Serial No. 603,136.

*To all whom it may concern:*

Be it known that I, DELONA L. CALAHAN, a citizen of the United States, residing at Centralia, in the county of Lewis and State of Washington, have invented a new and useful Turning-Tool, of which the following is a specification.

The device forming the subject matter of this application, is a cutting tool adapted to be employed in a turning lathe, for fashioning porch columns and like circular structures which are commonly made from Oregon fir, a wood which is somewhat more brittle and more porous than the common bull pine of the South.

In fashioning columns from Oregon fir, considerable difficulty has been experienced heretofore, by reason of the fact that there is extant in the art, no lathe tools which will work this material without splintering. Moreover, owing to the difficulty in working this particular wood, there is, so far as I am advised as to the state of the art, no lathe tool which will in a single operation, cut down the wood to the required diameter, and give to the wood a finished appearance, without the aid of sand paper or a flat edged finishing tool.

It is the object of this invention, therefore, broadly speaking, to provide a lathe tool which, in a single passage over the material, will reduce the material to the required diameter, and leave a smooth finish, so that a completed structural element will be fashioned by a single passage of the tool longitudinally of the material, when the material is rotated in a lathe.

A lathe peculiarly adapted for the use of the tool herein disclosed, is shown in my co-pending application, Serial No. 601,796, but it may profitably be stated here that as the material is rotated in a lathe, the tool herein disclosed is advanced from one end of the material to the other, as is common in turning operations.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figures 1 and 2 are perspectives of the tool, showing both right hand and left hand constructions; Fig. 3 is a side elevation; Fig. 4 is a front elevation; Fig. 5 is a rear elevation; Fig. 6 is a top plan; and Fig. 7 is a fragmental front elevation showing the tool in operative relation to the work in hand.

The tool comprises a shank 1 and a rectangularly disposed head 2, the plane of the head 2, however, slanting downwardly from the rear of the tool toward the front thereof, as denoted by the numeral 3, and as seen most clearly in Fig. 5. The head 2 is provided at its front, with a cutting edge which, when the tool is viewed in top plan, as shown in Fig. 6, convexes outwardly, as shown at 4. When, however, the tool is viewed in front elevation, this cutting edge will be seen to consist of a straight intermediate portion 5, upturned as denoted by the numeral 6, adjacent the free end of the head 2, and upturned as denoted by the numeral 7, adjacent the point of union between the head 2 and the shank 1. The upturned portion 7 of the cutting edge is concaved as shown at 8, and extended beneath the shank 1, as seen most clearly at 9 in Fig. 3. The head 2 is thinned from its point of union with the shank 1 toward the free end of the head, and the portion 6 of the cutting edge is carried around upon the free end of the head 2, as shown at 10.

As the tool moves along the rotating material 11, the straight portion 5 of the cutting edge will give to the material a smooth surface, the upturned ends 6 and 7 of the cutting edge preventing a splintering of the material, both when the cutting edge enters the material and when the cutting edge leaves the material. A splintering of the material is further prevented by reason of the fact that the cutting edge is concaved and back set into the shank 1, as shown at 8.

Noting particularly Fig. 6, and recalling the convexity 4 of the cutting edge, which convexity appears when the device is viewed in top plan as in Fig. 6, but not when the tool is viewed in elevation as in Figs. 4 and 7, it will be noted that as the tool is advanced along the material 11, a draw cut will be produced, this draw cut resulting from the convexity of the cutting edge, shown at 4. This draw cut, produced by the construction above referred to serves to effect a smooth finish upon the material and to prevent a splintering thereof.

Having thus described the invention, what is claimed is:—

A tool of the character described, comprising a shank and a right angularly disposed head, the head being provided with a cutting edge, which, when the head is viewed in elevation, consists of a straight intermediate portion, and upturned end portions; that end portion which is adjacent the shank, being concaved in the general direction of the axis of the shank, and concaved transversely of the general direction of the axis of the shank.

In testimony that I claim the foregoing as my own, I have hereto affixed my signature in the presence of two witnesses.

DELONA L. CALAHAN.

Witnesses:
 CLYDE SCALES,
 WM. T. LYONS.